(12) United States Patent  
Kang et al.

(10) Patent No.: US 9,201,789 B1  
(45) Date of Patent: Dec. 1, 2015

(54) STORAGE DEVICE AND OPERATING METHOD OF THE SAME

(71) Applicant: Samsung Electronics Co., Ltd., Suwon-si, Gyeonggi-do (KR)

(72) Inventors: Nam Wook Kang, Hwaseong-si (KR); In Hwan Doh, Seoul (KR); Chul Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/720,139

(22) Filed: May 22, 2015

(30) Foreign Application Priority Data

Dec. 15, 2014 (KR) .................. 10-2014-0180346

(51) Int. Cl.
  *G06F 12/00* (2006.01)
  *G06F 12/02* (2006.01)
  *G06F 12/06* (2006.01)

(52) U.S. Cl.
  CPC ........ *G06F 12/0246* (2013.01); *G06F 12/0638* (2013.01); *G06F 2212/205* (2013.01); *G06F 2212/7211* (2013.01)

(58) Field of Classification Search
  CPC ............ G06F 12/0246; G06F 12/0638; G06F 2212/7211
  USPC ....................................................... 711/103
  See application file for complete search history.

(56) References Cited

U.S. PATENT DOCUMENTS

| 7,039,781 | B2 | 5/2006 | Iwata et al. |
| 7,679,133 | B2 | 3/2010 | Son et al. |
| 7,710,777 | B1 * | 5/2010 | Montierth et al. ........ 365/185.09 |
| 8,151,036 | B2 | 4/2012 | Yasufuku |
| 8,199,583 | B2 | 6/2012 | Kim et al. |
| 8,553,466 | B2 | 10/2013 | Han et al. |
| 8,559,235 | B2 | 10/2013 | Yoon et al. |
| 8,626,986 | B2 | 1/2014 | Wu et al. |
| 8,654,587 | B2 | 2/2014 | Yoon et al. |
| 8,681,554 | B2 | 3/2014 | Suzuki |
| 2004/0193774 | A1 | 9/2004 | Iwata et al. |
| 2007/0050536 | A1 * | 3/2007 | Kolokowsky .................. 711/103 |
| 2007/0081386 | A1 | 4/2007 | Yoon |
| 2007/0233931 | A1 * | 10/2007 | Tanaka et al. ...................... 711/5 |
| 2009/0121271 | A1 | 5/2009 | Son et al. |
| 2009/0216937 | A1 | 8/2009 | Yasufuku |
| 2010/0135077 | A1 | 6/2010 | Kim et al. |
| 2011/0216603 | A1 | 9/2011 | Han et al. |
| 2011/0233648 | A1 | 9/2011 | Seol et al. |
| 2012/0005405 | A1 | 1/2012 | Wu et al. |
| 2012/0051143 | A1 | 3/2012 | Yoon et al. |
| 2012/0159058 | A1 | 6/2012 | Yonezawa et al. |
| 2013/0051144 | A1 | 2/2013 | Suzuki |
| 2013/0250677 | A1 | 9/2013 | Nam et al. |
| 2013/0279262 | A1 | 10/2013 | Yoon et al. |
| 2014/0237286 | A1 | 8/2014 | Jung et al. |

FOREIGN PATENT DOCUMENTS

KR   1020100106763 A   10/2010

* cited by examiner

*Primary Examiner* — Jae Yu
(74) *Attorney, Agent, or Firm* — Harness, Dickey & Pierce, P.L.C.

(57) ABSTRACT

A storage device includes a nonvolatile memory and a memory controller. The memory controller is configured to receive a first program request from an external host device and program first memory cells of a memory block according to the first program request. The memory controller is further configured to program second memory cells of the memory block without a request of the external host device if a second program request is not received from the external host device for a critical time.

30 Claims, 10 Drawing Sheets

STORAGE DEVICE AND OPERATING METHOD OF THE SAME

CROSS-REFERENCE TO RELATED APPLICATIONS

This US non-provisional patent application claims priority under 35 USC §119 to Korean Patent Application No. 10-2014-0180346, filed on Dec. 15, 2014, the entirety of which is hereby incorporated by reference.

BACKGROUND

Example embodiment of inventive concepts relate generally to semiconductor memory devices and, more particularly, to storage devices and/or operating methods of the same.

A storage device is a device that stores data according to the control of a host device such as a computer, a smartphone, and a smart pad. Storage devices include a device that stores data on a magnetic disk such as a hard disk drive (HDD) and a device that stores data in a semiconductor memory (e.g., a nonvolatile memory such as a solid state drive (SSD) or a memory card).

Nonvolatile memory devices include a read-only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like.

With the advance in semiconductor manufacturing technology, high integration and high capacity of storage devices are in progress. The high integration of storage devices may reduce manufacturing costs. However, as the high integration of storage devices causes reduction in their scales and change in their structures, various problems may damage data stored in a storage device and/or degrade the reliability of the storage device.

SUMMARY

The present disclosure relates to a storage device with improved reliability and operating speed and an operating method of the storage device.

A storage device according to example embodiments of inventive concepts may comprise a nonvolatile memory and a memory controller. The nonvolatile memory includes a plurality of memory blocks, each memory block including a plurality of cell strings on a substrate, each cell string including at least one ground selection transistor, a plurality of memory cells and at least one string selection transistor stacked on the substrate in a direction perpendicular to the substrate, each of the at least one ground selection transistor, a plurality of memory cells and at least one string selection transistor including a charge trap layer. The memory controller is configured to receive a first program request from an external host device and program first memory cells of a memory block according to the first program request. The memory controller is further configured to program second memory cells of the memory block without a request of the external host device if a second program request is not received from the external host device for a critical time.

A storage device according to example embodiments of inventive concepts may include a nonvolatile memory a nonvolatile memory and a memory controller configured to control the nonvolatile memory. The memory controller is configured to receive a first program request, program first memory cells of the nonvolatile memory device in response to the first program request, and program second memory cells of the nonvolatile memory without a request of an external host device if a second program request has not received from the external host device within a critical time after programming the first memory cells or receiving the first program request.

Example embodiments of inventive concept relates to an operating method of a storage device including a nonvolatile memory and a memory controller configured to control the nonvolatile memory. The operating method may include receiving a first program request using the memory controller from an external host device, programming first memory cells of the nonvolatile memory using the memory controller in response to the first program request, and programming second memory cells of the nonvolatile memory using the memory controller without a request of the external host device if a second program request is not received from the external host device for a critical time.

A solid state drive according to example embodiments of inventive concepts may include a nonvolatile memory including a plurality of memory blocks, a random access memory, and a memory controller configured to receive a first program request from an external device, store first data received from the external device in association with the first program request into the random access memory, and program first memory cells of a memory block with the first data stored in the random access memory according to the first program request. The memory controller may be further configured to program second memory cells of the memory block without a request and data from the external host device if a second program request has not received from the external host device for critical time.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
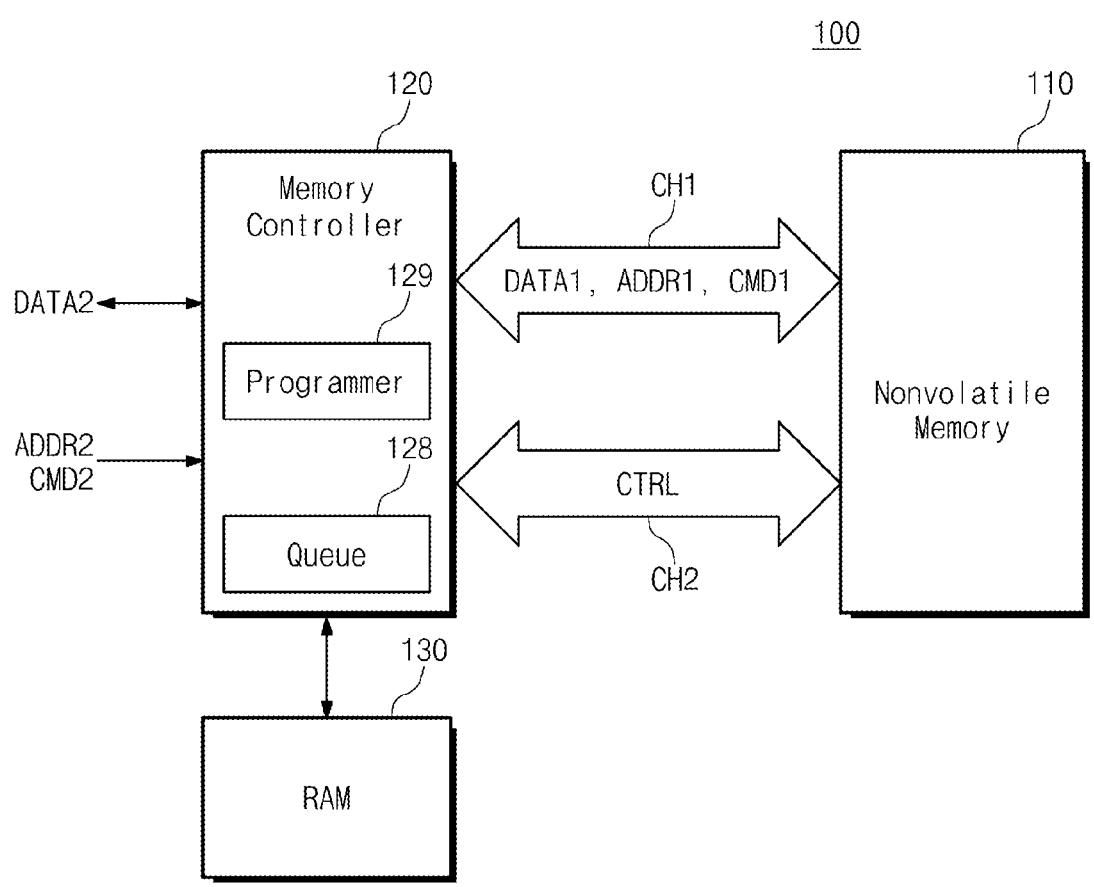
FIG. 1 is a block diagram of a storage device according to example embodiments of inventive concepts.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a block diagram of a storage device 100 according to example embodiments of inventive concepts. As illustrated, the storage device 100 includes a nonvolatile memory 110, a memory controller 120, and a random access memory (RAM) 130.

The nonvolatile memory 110 may perform write, read, and erase operations according to the control of the memory controller 120. The nonvolatile memory 110 may exchange first data DATA1 with the memory controller 120. For example, the nonvolatile memory 110 may receive the first data DATA1 from the memory controller 120 and write the first data DATA1. The nonvolatile memory 110 may perform a read operation and output the read first data DATA1 to the memory controller 120.

The nonvolatile memory 110 may receive a first command CMD1 and a first address ADDR1 from the memory controller 120. The nonvolatile memory 110 may exchange a control signal CTRL with the memory controller 120. For example, the nonvolatile memory 110 may receive, from the memory controller 120, at least one of a chip select signal /CE to select at least one of semiconductor chips constituting the nonvolatile memory 110, a command latch enable signal CLE to indicate that a signal received from the memory controller 120 is the first command CMD1, an address latch enable signal ALE to indicate that a signal received from the memory controller 120 is the first address ADDR1, a read enable signal /RE generated by the memory controller 120 during a read operation and periodically toggled to be used to set timings, a write enable signal /WE enabled by the memory controller 120 when the first command CMD1 or the first address ADDR1 is transmitted, a write protection signal /WP enabled by the memory controller 120 to limit (and/or prevent) an unintentional write or erase operation when power changes, and a data strobe signal DQS generated by the memory controller 120 during a write operation and periodically toggled to be used to set input synchronization of the first data DATA1. For example, the nonvolatile memory 110 may output, to the memory controller 120, at least one of a ready/busy signal R/nB to indicate that the nonvolatile memory 110 is performing a program, erase or read operation and a data strobe signal DQS generated from the read enable signal /RE by the nonvolatile memory 110 and toggled to be used to set output synchronization of the first data DATA1.

In example embodiments, the first data DATA1, the first address ADDR1, and the first command CMD1 may communicate with the memory controller 120 through a first channel CH1. The first channel CH1 may be an input/output channel. The control signal CTRL may communicate with the memory controller 120 through a second channel CH2. The second channel CH2 may be a control channel.

The nonvolatile memory 110 may include a flash memory. However, the nonvolatile memory 110 is not limited to inclusion of the flash memory. The nonvolatile memory 110 may include at least one of various nonvolatile memory devices such as a phase-change RAM (PRAM), a magnetic RAM (MRAM), a resistive RAM (RRAM), and a ferroelectric RAM (FeRAM).

The memory controller 120 is configured to control the nonvolatile memory 110. For example, the memory controller 120 may control the nonvolatile memory 110 to perform a write, read or erase operation. The memory controller 120 may exchange the first data DATA1 and the control signal CTRL with the nonvolatile memory 110 and output the first command CMD1 and the first address ADDR1 to the nonvolatile memory 110.

The memory controller 120 may control the nonvolatile memory 110 according to the control of an external host device (not shown). The memory controller 120 may exchange second data DATA2 with the host device and receive a second command CMD2 and a second address ADDR2 from the host device.

In example embodiments, the memory controller 120 may exchange the first data DATA1 with the nonvolatile memory 110 in a first unit (e.g., time unit or data unit) and exchange the second data DATA2 with the host device in a second unit (e.g., time unit or data unit).

The memory controller 120 may exchange the first data DATA1 with the nonvolatile memory 110 and transmit the first command CMD1 and the first address ADDR to the nonvolatile memory 110 according to a first format. The memory controller 120 may exchange the second data DATA2 with the host device and receive the second command CMD2 and the second address ADDR2 from the host device according to a second format different from the first format.

The memory controller 120 may use the RAM 130 as a buffer memory, a cache memory or a working memory. For example, the memory controller 120 may receive the second data DATA2 from the host device, store the received second data DATA2 in the RAM 130, and write the stored second data DATA2 into the nonvolatile memory 110 as the first data DATA1. The memory controller 120 may read the first data DATA1 from the nonvolatile memory 110, store the received first data DATA1 in the RAM 130, and output the stored first data DATA1 to the host device as the second data DATA2. The memory controller 130 may store the data read from the nonvolatile memory 110 in the RAM 130 and rewrite the stored data into the nonvolatile memory 110.

The memory controller 120 may store data or a code required to manage the nonvolatile memory 110 in the RAM 130. For example, the memory controller 120 may read the data or the code required to manage the nonvolatile memory 110 from the nonvolatile memory 110 and load the data or the code to the RAM 130 to drive the nonvolatile memory 110.

The memory controller 120 includes a background program queue 128 and a care programmer 129. The background program queue 128 is configured to store program requests incurred by a background operation. For example, the background operation may be internally performed by the memory controller 120 without intervention (e.g., request) of an external host device. For example, the external host device may not identify whether the background operation is performed. For example, the background operation may include garbage collection, wear-leveling, bad block management, and read reclaim.

When the storage device 100 is in an idle state, the memory controller 120 may control the program of the nonvolatile memory 110 according to program requests registered in the background program queue 128. For example, the idle state may be a state in which there is no work that is requested by the external host device and must be performed by the storage device 100.

A care programmer 129 may manage the care program. For example, when there is no write data received from the external host device for critical time TCR, the care programmer 129 may perform a care program on the nonvolatile memory 110 with reference to the background program queue 128.

The RAM 130 may include at least one of various random access memory devices such as a dynamic RAM (DRAM), a static RAM (SRAM), a synchronous DRAM (SDRAM), a phase-change RAM (PRAM), a magnetic RAM (MRAM), a resistive RAM (RRAM), and a ferroelectric RAM (FeRAM).

The storage device 100 may perform address mapping to reduce an overhead that an erase operation occurs in the nonvolatile memory 110. For example, when overwrite is requested from the external host device, the storage device 100 may store overwrite-requested data in memory cells of a free storage space instead of erasing memory cells in which existing data is stored and storing overwrite-requested data in the erased memory cells. The memory controller 120 may drive a flash translation layer (FTL) to map a logical address used in the external host device and a physical address used in the nonvolatile memory 110 according to the foregoing method. For example, the second address ADDR2 may be a logical address and the first address ADDR1 may be a physical address.

The storage device 100 may write, read or erase data according to a request of the host device. The storage device 100 may include a solid state drive (SSD) or a hard disk drive (HDD). The storage device 100 may include a person computer memory card international association (PCMCIA) card, a compact flash card (CF), a smart media card (SM or SMC), a memory stick, a multimedia card (MMC, RS-MMC or MMCmicro), an SD card (SD, miniSD, microSD or SDHC), a universal flash storage (UFS). The storage device 1300 may include an embedded memory such as an embedded multimedia card (eMMC), UFS, and perfect page new (PPN).

Figure 2:
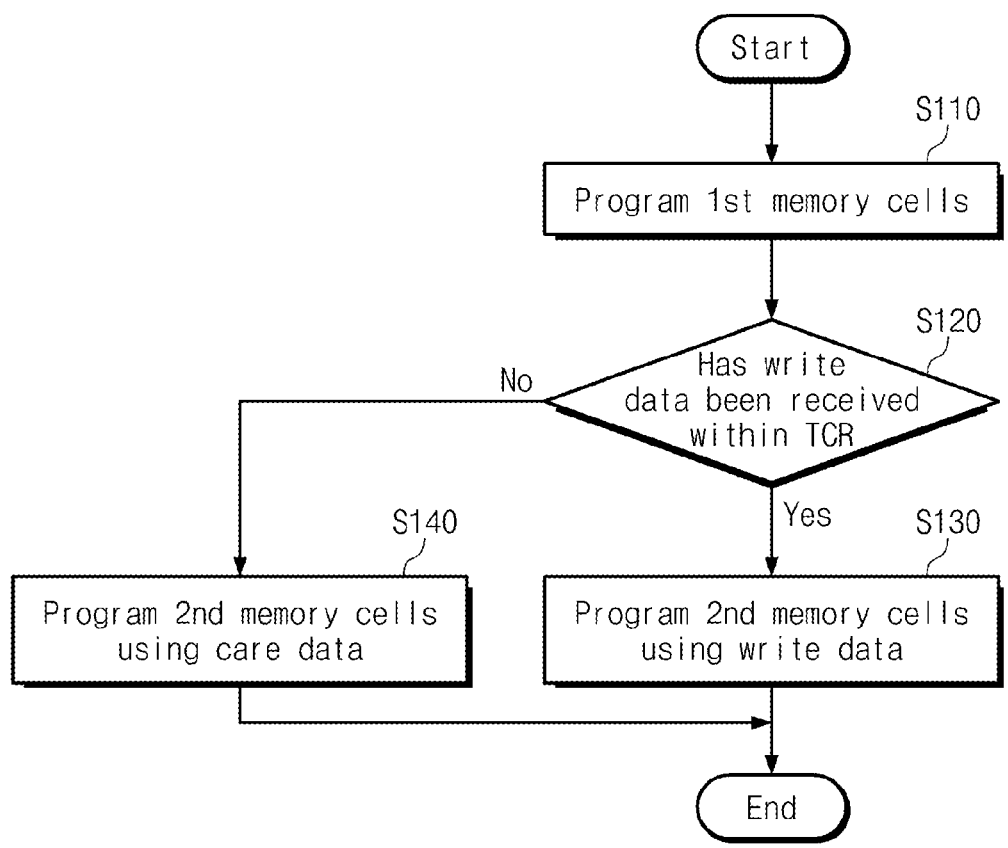
FIG. 2 is a flowchart summarizing an operating method of a storage device according to example embodiments of inventive concepts.

FIG. 2 is a flowchart summarizing an operating method of a storage device 100 according to example embodiments of inventive concepts. Referring to FIGS. 1 and 2, the memory controller 120 may program first memory cells of the nonvolatile memory 110 (S110).

The memory controller 120 may determine whether write data has been received from the external host device until the lapse of critical time TCR (S120).

When the write data has been received from the external host device within the critical time TCR or there is write data previously received from the external host device, the flow proceeds to S130. The memory controller 120 may program second memory cells of the nonvolatile memory 110 using the write data (S130).

When there is no write data received from the external host device until the lapse of the critical time TCR after the first memory cells are programmed, the care programmer 129 may program second memory cells of the nonvolatile memory 110 using care data. For example, the care programmer 129 may perform a care program on the second memory cells using the care data. The care data may be obtained with reference to the background program queue 128.

Figure 3:
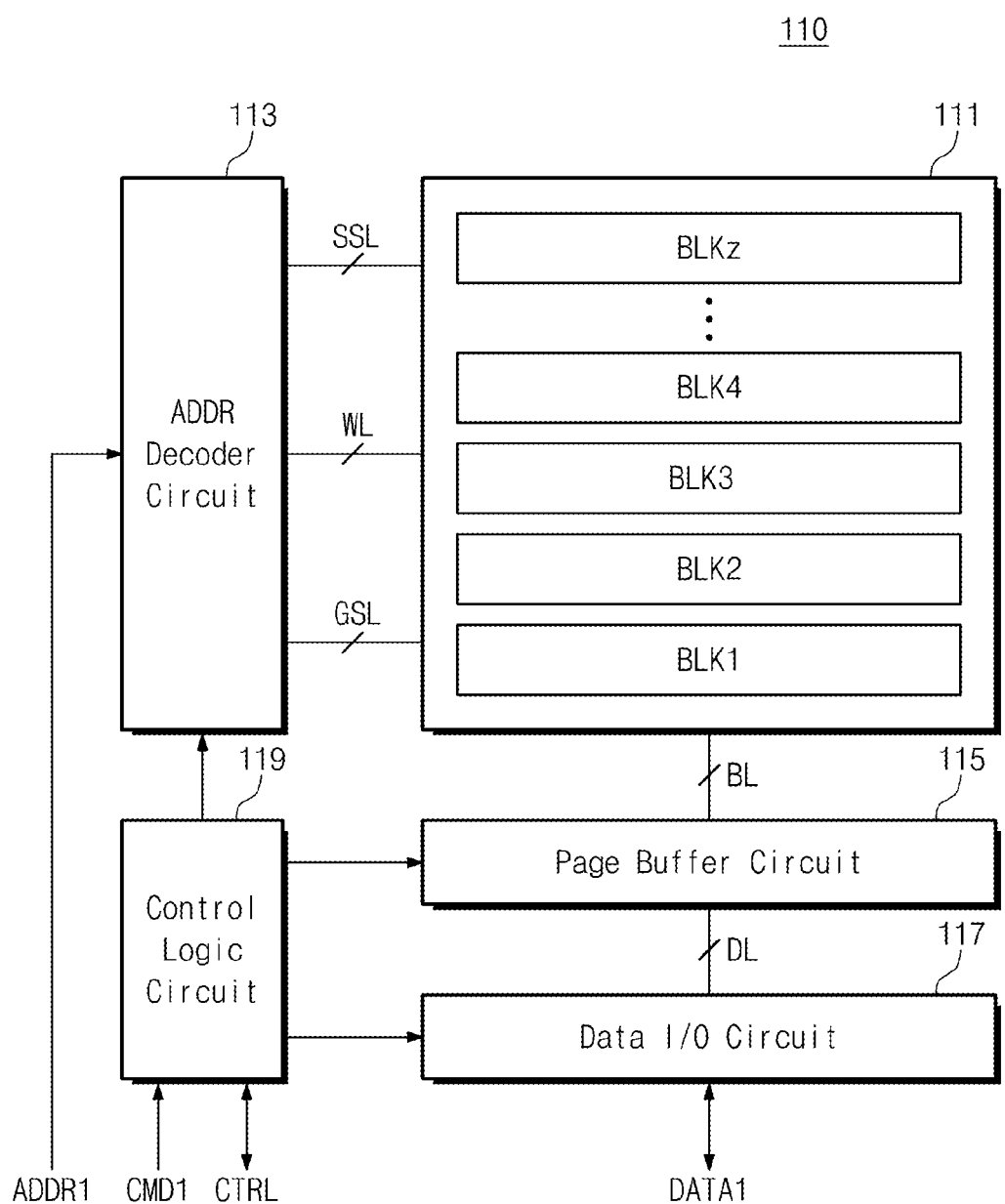
FIG. 3 is a block diagram of a nonvolatile memory according to example embodiments of inventive concepts.

FIG. 3 is a block diagram of a nonvolatile memory 110 according to example embodiments of inventive concepts. Referring to FIGS. 1 and 3, the nonvolatile memory 110 includes a memory cell array 111, an address decoder circuit 113, a page buffer circuit 115, a data input/output (I/O) circuit 117, and a control logic circuit 119.

The memory cell array 111 may include a plurality of memory blocks BLK1 to BLKz. Each of the memory blocks BLK1 to BLKz includes a plurality of memory cells. Each of the memory blocks BLK1 to BLKz may be connected to the address decoder circuit 113 through at least one ground selection line GSL, a plurality of wordlines WL, and at least one string selection line SSL. Each of the memory blocks BLK1 to BLKz may be connected to a page buffer circuit 115 through a plurality of bitlines BL. The memory blocks BLK1 to BLKz may be commonly connected to the bitlines BL. Memory cells of the memory blocks BLK1 to BLKz may have the same structure. In example embodiments, each of the memory blocks BLK1 to BLKz may be a unit of an erase operation. Memory cells of the memory cell array 111 may be erased in units of a single memory block. Memory blocks belonging to a single memory block may be erased at the same time. Alternatively, in example embodiments, each of the memory blocks BLK1 to BLKz may be divided into a plurality of sub-blocks and each of the sub-blocks may be a unit of an erase operation.

The address decoder circuit 113 is connected to the memory cell array 111 through a plurality of ground selection lines GSL, a plurality of wordlines WL, and a plurality of string selection lines SSL. The address decoder circuit 113 operates according to the control of the control logic circuit 119. The address decoder circuit 113 may receive a first address ADDR1 from the memory controller 120. The address decoder 113 may decode the received first address ADDR1 and control voltages applied to the wordlines WL according to the decoded address.

For example, during a program operation, the address decoder circuit 113 may apply a program voltage VGPM to a selected wordline of a selected memory block indicated by the first address ADDR1 and apply a pass voltage VPASS to unselected wordlines of the selected memory block. During a read operation, the address decoder circuit 131 may apply a select read voltage VRD to the selected wordline of the selected memory block indicated by the first address ADDR1 and apply an unselect read voltage VREAD to unselected wordlines of the selected memory. During an erase operation, the address decoder circuit 113 may apply an erase voltage (e.g., ground voltage) to wordlines of the selected memory block indicated by the first address ADDR1.

The page buffer circuit 115 is connected to the memory cell array 111 through a plurality of bitlines BL. The page buffer circuit 115 is connected to the data I/O circuit 117 through a plurality of data lines DL. The page buffer circuit 115 operates according to the control of the control logic 119.

The page buffer circuit 115 may store data to be programmed into memory cells of the memory cell array 111 or data read from the memory cells. During a program operation, the page buffer circuit 115 may store the data to be programmed into the memory cells. The page buffer circuit 115 may bias a plurality of bitlines BL based on stored data. The page buffer circuit 115 may function as a write driver during the program operation. During a read operation, the page buffer circuit 115 may sense voltages of the bitlines BL and store a sensing result. The page buffer circuit 115 may function as a sense amplifier during the read operation.

The data I/O circuit 117 is connected to the page buffer circuit 115 through a plurality of data lines DL. The data I/O circuit 117 may exchange first data DATA1 with the memory controller 120.

The data I/O circuit 117 may temporarily store the first data DATA1 received from the memory controller 220. The data I/O circuit 117 may transmit the stored data to the page buffer circuit 115. The data I/O circuit 117 may temporarily store data DATA transmitted from the page buffer circuit 115. The data I/O circuit 117 may transmit the stored data DATA to the memory controller 220. The data I/O circuit 117 may function as a buffer memory.

The control logic circuit 119 receives a first command CMD1 and a control signal CTRL from the memory controller 220. The control logic 119 may decode the received first command CMD1 and control the overall operation of the nonvolatile memory 110 according to the decoded command.

In example embodiments, during a read operation, the control logic circuit 119 may generate and output a data strobe signal DQS from a read enable signal /RE of the received control signal CTRL. During a write operation, the control logic circuit 119 may receive the data strobe signal DQS as the control signal CTRL.

Figure 4:
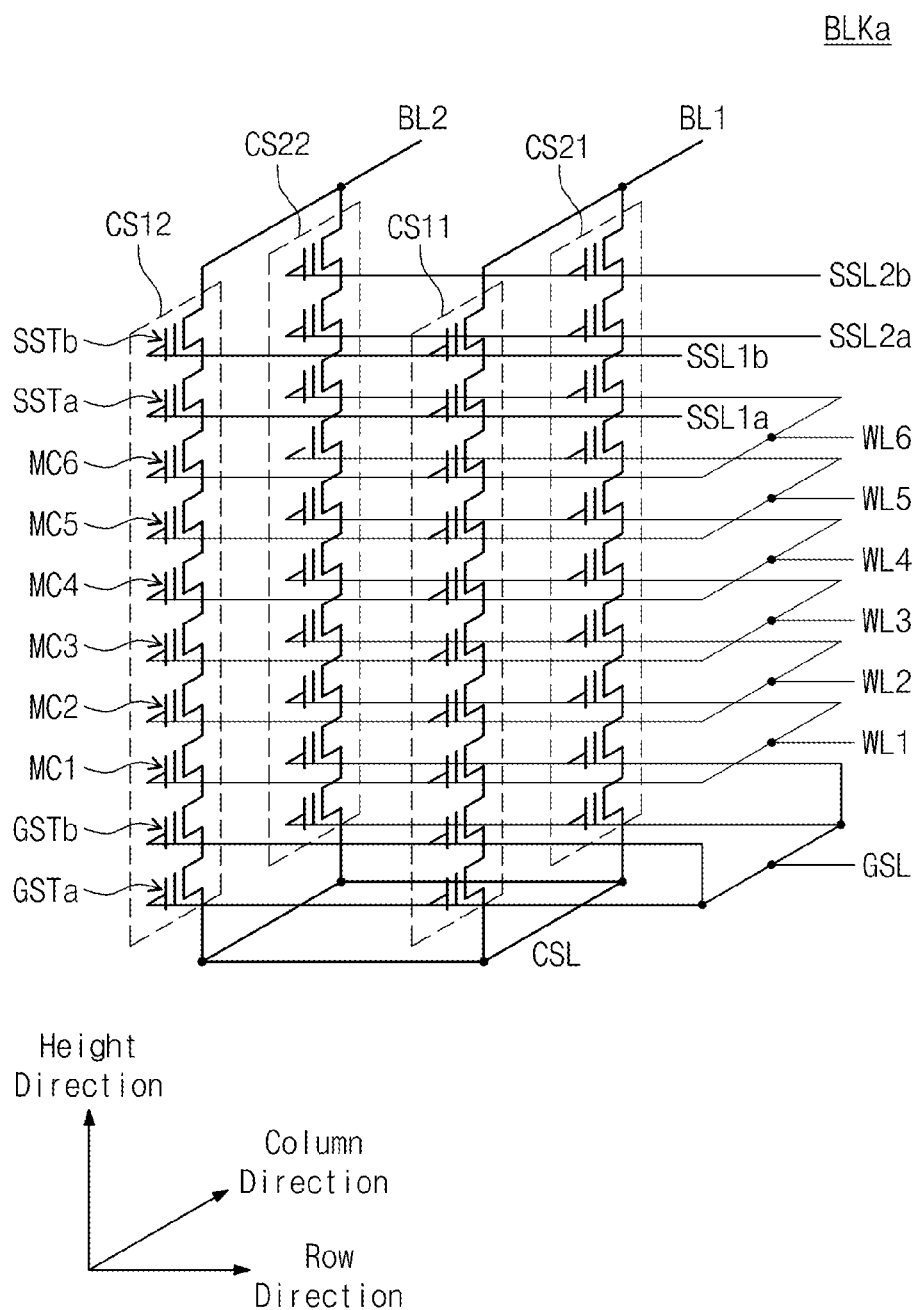
FIG. 4 is a circuit diagram of a memory block according to example embodiments of inventive concepts.

FIG. 4 is a circuit diagram of a memory block BLKa according to example embodiments of inventive concepts. As illustrated, the memory block BLKa includes a plurality of cell strings CS11 to CS21 and CS12 to CS22. The cell strings CS11 to CS21 and CS12 to CS22 may be arranged in a row direction and a column direction to form rows and columns.

For example, the cell strings CS11 and CS12 arranged in the row direction may form a first row, and the cell strings CS21 and CS22 arranged in the row direction may form a second row. The cell strings CS11 and CS21 arranged in the column direction may form a first column, and the cell strings CS12 and CS22 arranged in the column direction may form a second column.

Each cell string may include a plurality of cell transistors. The cell transistors include ground selection transistors GSTa and GSTb, memory cells MC1 to MC6, and string selection transistors SSTa and SSTb. The ground selection transistors GSTa and GSTb, the memory cells MC1 to MC6, and the string selection transistors SSTa and GSTb of each cell string may be stacked in a direction perpendicular to a plane on which the cell strings CS11 to CS21 and CS12 to CS22 are arranged in a matrix of rows and columns (e.g., a plane on a substrate of the memory block BLKb). In other words, the memory cells MC1 to MC6 may be stacked on top of each other between the ground selection transistors GSTa and GSTb and string selection transistors SSTa and SSTb.

The plurality of cell transistors may be charge trap type transistors having threshold voltages that vary depending on the amount of charged trapped to an insulating layer.

Lowermost ground selection transistors GSTa may be commonly connected to the common source line CSL.

The ground selection transistors GSTa and GSTb of the cell strings CS11 to CS21 and CS12 to CS22 may be commonly connected to the ground selection line GSL.

In example embodiments, ground selection transistors of the same height (or order) may be connected to the same ground selection line, and ground selection transistors of different heights (or orders) may be connected to different ground selection lines. For example, ground selection transistors GSTa of first height may be commonly connected to a first ground selection line, and ground selection transistors GSTb of second height may be commonly connected to a second ground selection line.

In example embodiments, ground selection transistors of the same row may be connected to the same ground selection line, and ground selection transistors of different rows may be connected to different ground selection lines. For example, ground selection transistors GSTa and GSTb of cell strings CS11 and CS12 of a first row may be connected to a first ground selection line, and ground selection lines GSTa and GSTb of cell strings CS21 and CS22 of a second row may be connected to a second ground selection line.

Memory cells disposed at the same height (or order) from a substrate (or ground selection transistors GST) may be connected to a single wordline, and memory cells disposed at different heights (or orders) may be connected to different wordlines WL1 to WL6, respectively. For example, memory cells MC1 are commonly connected to the wordline WL1. Memory cells MC3 are commonly connected to the wordline WL4. Memory cells MC4 are commonly connected to the wordline WL5. Memory cells MC6 are commonly connected to the wordline WL6.

In a first string selection transistor SSTa of the same height (or order) of the cell strings CS11 to CS21 and CS12 to CS22, first string selection transistors SSTa of different rows are connected to different string selection lines SSL1a to SSL2a, respectively. For example, first string selection transistors SSTa of the cell strings CS11 and CS12 are commonly connected to a string selection line SSL1a. First string selection transistors SSTa of the cell strings CS21 and CS22 are commonly connected to a string selection line SSL2a.

In a second string selection transistor SSTb of the same height (or order) of the cell strings CS11 to CS21 and CS12 to CS22, second string selection transistors SSTb of different rows are connected to different string selection lines SSL1b to SSL2b, respectively. For example, second string selection transistors SSTb of the cell strings CS11 and CS12 are commonly connected to a string selection line SSL1b. First string selection transistors SSTb of the cell strings CS21 and CS22 are commonly connected to a string selection line SSL2b.

That is, cell strings of different rows are connected to different string selection lines. String selection transistors of the same height (or order) of the same row are connected to the same string selection line. String selection transistors of different heights (or orders) of the same row are connected to different string selection lines.

In example embodiments, string selection transistors of cell strings of the same row may be connected to a single string selection line. For example, string selection transistors SSTa and SSTb of a first row may be commonly connected to a single string selection line. String selection transistors SSTa and SSTb of cell strings CS21 and CS22 of a second row may be commonly connected to a single string selection line.

Columns of a plurality of cell strings CS11 to CS21 and CS12 to CS22 are connected to different bitlines BL1 and BL2, respectively. For example, string selection transistors SSTb of cell strings CS11 to CS21 of a first column are commonly connected to a bitline BL1. String selection transistors SST of cell strings CS12 to CS22 of a second column are commonly connected to a bitline BL2.

The cell strings CS11 and CS12 may form a first plane. The cell strings CS21 and CS22 may form a second plane.

In the memory block BLKa, write and read operations may be performed in units of rows. For example, a single plane of the memory block BLKa may be selected by string selection lines SSL1a, SSL1b, SSL2a, and SSL2b. When the string selection lines SSL1a and SSL1b are supplied with a turn-on voltage and the string selection lines SSL2a and SSL2b are supplied with a turn-off voltage, cell strings CS11 and CS12 of the first plane are connected to the bitlines BL1 and BL2, e.g., the first plane is selected. When the string selection lines SSL2a and SSL2b are supplied with a turn-on voltage and the string selection lines SSL1a and SSL1b are supplied with a turn-off voltage, cell strings CS21 and CS22 of the second plane are connected to the bitlines BL1 and BL2, e.g., the second plane is selected. In the selected plane, a single row of the memory cells MC may be selected by the wordlines WL1 to WL6. In the selected row, a write or read operation may be performed.

In the memory block BLKa, an erase operation may be performed in units of memory blocks or sub-blocks. When the erase operation is performed in units of memory blocks, all memory cells MC of the memory block BLKa may be erased at the same time according to a single erase request. When the erase operation is performed in units of sub-blocks, some of the memory cells MC of the memory block BLKa may be erased at the same time according to a single erase request and the others may be erase-inhibited. A wordline connected to erased memory cells may be supplied with a low voltage (e.g., ground voltage), and a wordline connected to erase-inhibited memory cells may be floated.

The memory block BLKa shown in FIG. 4 is merely a non-limiting example. Example embodiments are not limited to the memory block BLKa shown in FIG. 4. For example, the number of rows of cell strings may increase or decrease. As the number of the rows of the cell strings varies, the number of string selection lines or the number of ground selection lines, and the number of cell strings connected to a single bitline may also vary.

The number of columns of cell strings may increase or decrease. As the number of columns of cell strings varies, the number of bitlines connected to the columns of the cell strings and the number of cell strings connected to a single string selection line may also vary.

The height of cell strings may increase or decrease. For example, the number of ground selection transistors, memory cells or string selection transistors stacked on the respective cell strings may increase or decrease.

In example embodiments, memory cells MC that are connected to a single wordline and belong to a single row may correspond to at least three pages. For example, k bits (k being an integer greater than or equal to 2) may be programmed into a single memory cell. In memory cells MC that are connected to a single wordline and belong to a single row, k bits programmed into each of the memory cell MC may form k pages.

The longer the left time of memory cells MC1 to MC6 after they are erased, the more reliability of the memory cells MC1 to MC6 may be degraded. In order to limit (and/or prevent) the reliability of the memory cells Mc1 to MC6 from being degraded, the care programmer 129 according to example embodiments of inventive concepts is configured to perform a care program when there is no write data of the external host device until the passage of the critical time TCR after the first memory cells (e.g., MC1) is programmed. Thus, the memory cells MC1 to MC6 are sequentially programmed within the critical time TCR after the memory blocks BLKa is erased. That is, since all the memory cells MC1 to MC6 are completely programmed within a total critical time, the reliability of the memory cells MC1 to MC6 is limited and/or prevented from being degraded. The total critical time or the critical time may be set such that degradation of the reliability of the memory cells MC1 to MC6 is below a critical level.

For example, the total critical time may be equal to multiplication of the critical time TCR and the number of program units formed by the memory cells MC1 to MC6 of the memory block BLKa. For example, memory cells corresponding to a single row and a single wordline may form a single program unit. In this case, memory cells MC1 to MC6 of cell strings CS11 and CS123 of a first row may form six program units, and memory cells MC1 to MC6 of cell strings CS21 and CS22 of a second row may form six program units. That is, the number of program units of the memory block BLKa may be equal to the multiplication of the number of rows of the memory cells MC1 to MC6 of the memory block BLKa and the number of wordlines WL1 to WL6.

In example embodiments of inventive concepts, a three dimensional (3D) memory array is provided. The 3D memory array may be monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In example embodiments of inventive concepts, the 3D memory array includes vertical NAND strings that are vertically oriented such that at least one memory cell is located over another memory cell. The at least one memory cell may comprise a charge trap layer. Each vertical NAND string further includes at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Figure 5:
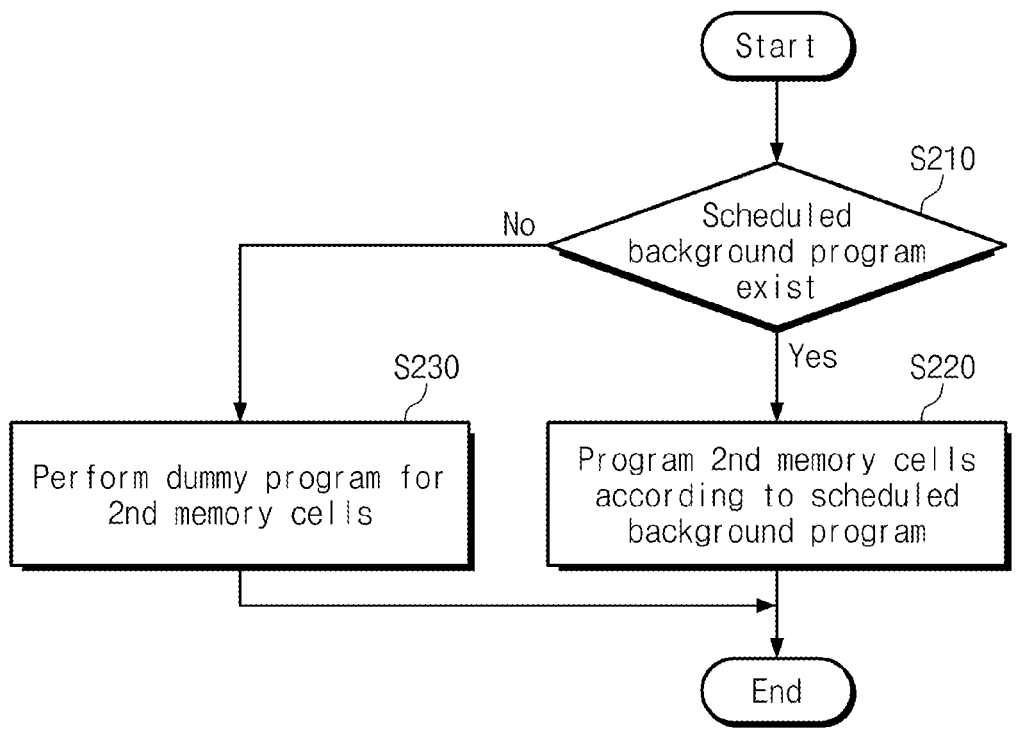
FIG. 5 is a flowchart summarizing a method of executing a care program according to example embodiments of inventive concepts.

FIG. 5 is a flowchart summarizing a method of executing a care program (S140) according to example embodiments of inventive concepts. Referring to FIGS. 1, 3, 4, and 5, the care programmer 129 determines whether there is a scheduled background program (S210). For example, the care programmer 129 may determine whether there is a background program request registered in the background program queue 128. When there is the background program request registered in the background program queue 128, the care programmer 129 may determine that there is the desired (and/or alternatively predetermined) background program.

When there is the scheduled background program, the care programmer 129 programs second memory cells (e.g., MC2 of the first row) according to the scheduled background program (S220). For example, the care programmer 129 may program data associated with the scheduled background program into the second memory cells MC2 of the first row as care data. The care programmer 129 may perform a scheduled background program operation on the second memory cells MC2 of the first row as a care program. For example, the care programmer 129 may program data corresponding to a single program unit among data of the scheduled background program into the second memory cells MC2 of the first row.

When there is no scheduled background program, the care programmer 129 may perform a dummy program operation on the second memory cells MC2 of the first row. For example, the care programmer 129 may program dummy data into the second memory cells MC2 of the first row as care data. The programmer 129 may execute a dummy program on the second memory cells MC2 of the first row as a care program.

As described with reference to FIGS. 2 and 4, the storage device 100 according to example embodiments of inventive concepts may perform a care program operation when there is no write data from the external host device for the critical time TCR. Thus, the storage device 100 program all the memory cells MC1 to MC6 of the memory block BLKa within the total critical time after the memory block BLKa is erased.

As described with reference to FIG. 5, the care programmer 129 executes a background program as a care program ahead of a dummy program. Thus, the number of programming the memory cells MC1 to MC6 by dummy data decreases. As a result, reliability of the storage device 100 is improved and an overhead resulting from the care program is reduced.

Figure 6:
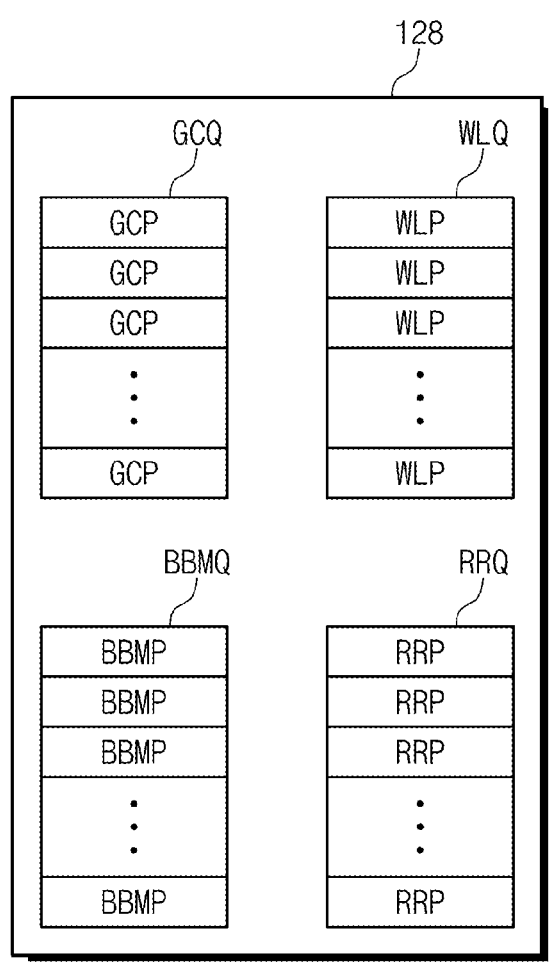
FIG. 6 is a block diagram of a background program queue according to example embodiments of inventive concepts.

FIG. 6 is a block diagram of a background program queue 128 according to example embodiments of inventive concepts. Referring to FIGS. 1 and 6, the background program queue 128 may include a plurality of sub-queues. For example, the background program queue 128 may include a garbage collection queue GCQ, a wear-leveling queue WLQ, a bad block management queue BBMQ, and a read reclaim queue RRQ. However, types of the background program queue 128 are not limited to the above shown in FIG. 6.

The garbage collection queue GCQ is configured to store program requests GCP incurred by garbage collection. For example, when a plurality of valid data and a plurality of invalid data are dispersed in the memory blocks BLK1 to BLKz, the garbage collection may include operations of allowing the plurality of valid data to migrate to a single memory block BLK and erasing memory blocks BLK from which collected data are originated. When the garbage collection is performed, program requests GCP may be generated to copy valid data to another memory block BLK from a memory block BLK in which the valid data and invalid data are stored. The program requests incurred by the garbage collection may be registered in the garbage collection queue GCQ.

The wear-leveling queue WLQ is configured to store program requests incurred by wear-leveling. For example, the wear-leveling may include an operation of leveling erase counts of the memory blocks BLK1 to BLKz. For example, the erase counts of the first memory block BLK1 may be greater than those of the second memory block BLK2 by a critical value or more. According to the wear-leveling, data of the first memory block BLK1 may migrate to the second memory block BLK2. That is, when the wear-leveling is performed, program requests WLP may be incurred to copy data stored in a memory block BLK of greater erase counts to another memory block BLK. The program requests WLP incurred by the wear-leveling may be registered in the wear-leveling queue WLQ.

The bad block management queue BBMQ is configured to store program requests BBMP incurred by bad block management. The bad block management includes an operation of setting a memory block BLK in which an error occurs, among the memory blocks BLK1 to BLKz, as a bad block. For example, when a program error occurs, a memory block BLK in which the program error occurs may be registered as a bad block. For example, a program operation is performed in the order from the first memory cells MC1 to the sixth memory cells MC6. When an error occurs when the fifth memory cells MC5 are programmed, a memory block BLKa may be treated as a bad block. In this case, data stored in the first to fourth memory cells MC1 to MC4 may be migrated to another normal memory block. That is, when bad block management is performed, the program requests BBMP may be incurred to copy data stored in the memory block BLK determined as a bad block to another memory block BLK. The program requests BBMP incurred by the bad block management may be registered in the bad block management queue BBMQ.

The read reclaim queue RRQ is configured to store program requests RRP incurred by read reclaim. The read reclaim includes an operation of allowing data stored in a memory block BLK in which a read error occurs to be migrated to another memory block. For example, the memory controller 120 may detect and correct an error during a read operation. If the number of detected errors exceeds the error correction range of the memory controller 120, an uncorrectable error may occur. In order to limit (and/or prevent) data loss caused by the uncorrectable error, the data stored in the corresponding memory block BLK may be migrated to another memory block BLK when the number of the errors (e.g., the number of error bits) occurring during the read operation reaches a critical value. The program requests RRP incurred by the read claim may be registered in the read reclaim queue RRQ.

In example embodiments, there may be a priority between sub-queues of the background program queue 128. For example, the order of the priority may be as follows: the garbage collection queue GCQ, the wear-leveling queue WLQ, the bad block management queue BBMQ, and the read reclaim queue RRQ. When there is a program request GCP in the garbage collection queue GCQ, the care programmer 129 may perform a care program operation using the program request GCP registered in the garbage collection queue GCQ. When there is no program request GCP in the garbage collection queue GCQ, the care programmer 129 may refer to the wear-leveling queue WLQ. Similarly, the care programmer 129 may select a program request GCP, WLP, BBMP or RRP to be referred to during the care program operation in the order of the garbage collection queue GCQ, the wear-leveling queue WLQ, the bad block management queue BBMQ, and the read reclaim queue RRQ.

Figure 7:
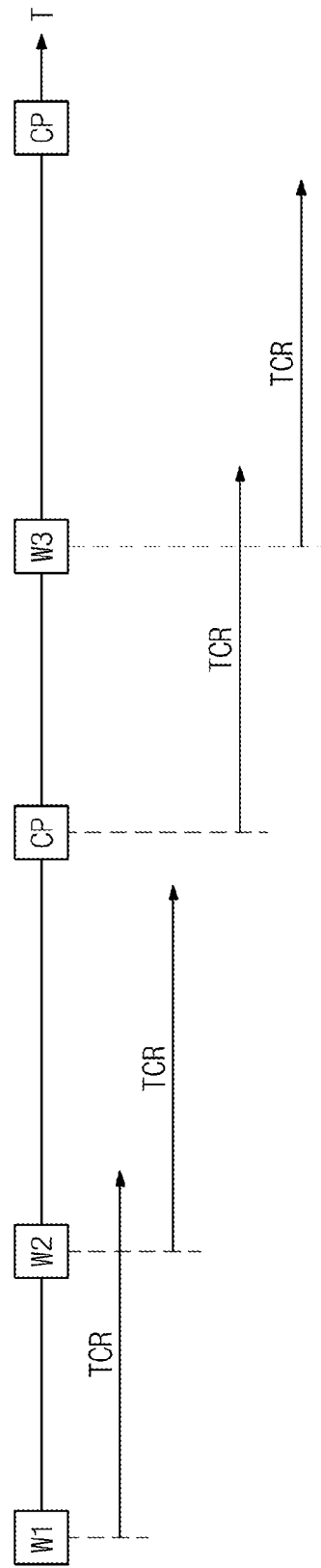
FIG. 7 illustrates the procedure of executing a program and a care program depending on the passage of time.
Figure 8:
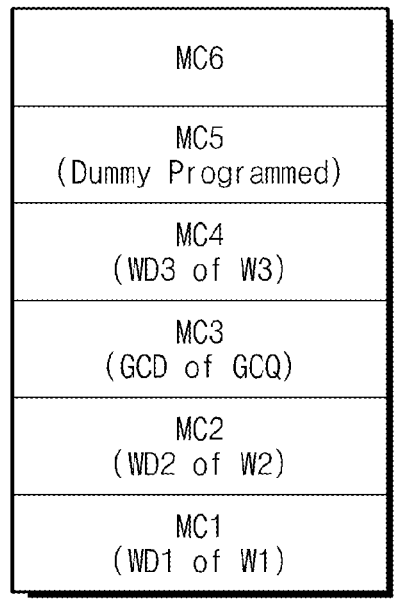
FIG. 8 illustrates an example of data programmed into memory cells of a first row of a memory block according to the procedure in FIG. 7.

FIG. 7 illustrates the procedure of executing a program and a care program depending on the passage of time, and FIG. 8 illustrates an example of data programmed into memory cells MC1 to MC6 of a first row of a memory block BLKa according to the procedure in FIG. 7.

Referring to FIGS. 1, 3, 4, 7, and 8, a first write request W1 is received from the external host device. The first write request W1 may be received together with first write data W1. The first write data W1 may correspond to a single program unit of the memory block BLKa, e.g., memory cells MC connected to a single row and a single wordline. In response to the first write request W1, the memory controller 120 may erase the memory block BLKa and program the first write data into first memory cells MC of the first row.

Critical time TCR is measured from the time when a program operation is performed according to the first write request W1. In example embodiments, a second write request W2 may be received from the external host device within the critical time TCR after the program operation is performed according to the first write request W1. The second write request W2 may be received together with second write data W2. The second write data W2 may correspond to a single program unit of the memory block BLKa. In response to the second write data W2, the memory controller 120 may program the second write data W2 of the second memory cells MC2 of the first row.

The critical time TCR may be measured from the time when a program operation is performed according to the second write request W2. In example embodiments, a write request may not be received from the external host device until the passage of the critical time TCR after the program operation is performed according to the second write request W2. When the critical time TCR passes, the memory controller 120 may perform a care program (CP) operation. In example embodiments, let it be assumed that a program request GCP is stored in the garbage collection queue GCQ of the background program queue 128. The care programmer 129 may program data GCD associated with a program request GCP into the third memory cells MC3 of the first row according to the program request GCP. For example, the care programmer 129 may perform the care program (CP) operation according to the program request GCP corresponding to a single program unit of the memory block BLKa among the program requests GCP registered in the garbage collection queue GCQ.

The critical time TCR is measured from the time when the care program (CP) operation is performed. In example embodiments, a third write request W3 may be received from the external host device within the critical time TCR after the care program (CP) operation is performed. The third write request W3 may be received together with third write data W3. The third write data W3 may correspond to a single program unit of the memory block BLKa. In response to the third write request W3, the memory controller 120 may program the third write data W3 into fourth memory cells MC4 of the first row.

The critical time TCR is measured from the time when a program operation is performed according to the third write request W3. In example embodiments, a write request may not be received from the external host device until passage of the critical time TCR after the program operation is performed according to the third write request W3. When the critical time TCR passes, the memory controller 120 may perform the care program (CP) operation. In example embodiments, let it be assumed that there is no program request registered in the background program queue 128. The care programmer 129 may perform a dummy program operation as a care program (CP) operation. According to the dummy program operation, fifth memory cells of the first row may be programmed with dummy data.

As described with reference to FIGS. 7 and 8, from the time when memory cells of a first program unit (e.g., first memory cells MC1 of a first row) are programmed after a memory block BLKa is erased, critical time TCR may be measured when from the time when memory cells MC of each program unit are programmed. When write data W of an external host device is prepared within the critical time TCR after memory cells MC of a current program unit are programmed, memory cells MC of the next program unit are programmed using the prepared write data W. When the write data W of the external host device is not prepared within the critical time TCR after the memory cells MC of the current program unit are programmed, the memory cells MC of the next program unit are care-programmed.

During the care program operation, when a background program request is prepared, memory cells MC of the next program unit are programmed according to the background program request. When the background program request is not prepared, the memory cells MC of the next program unit are dummy-programmed.

When the last program unit of the memory block BLKa, e.g., sixth memory cells MC6 of a second row are programmed, measurement of the critical time TCR is not performed.

Figure 9:
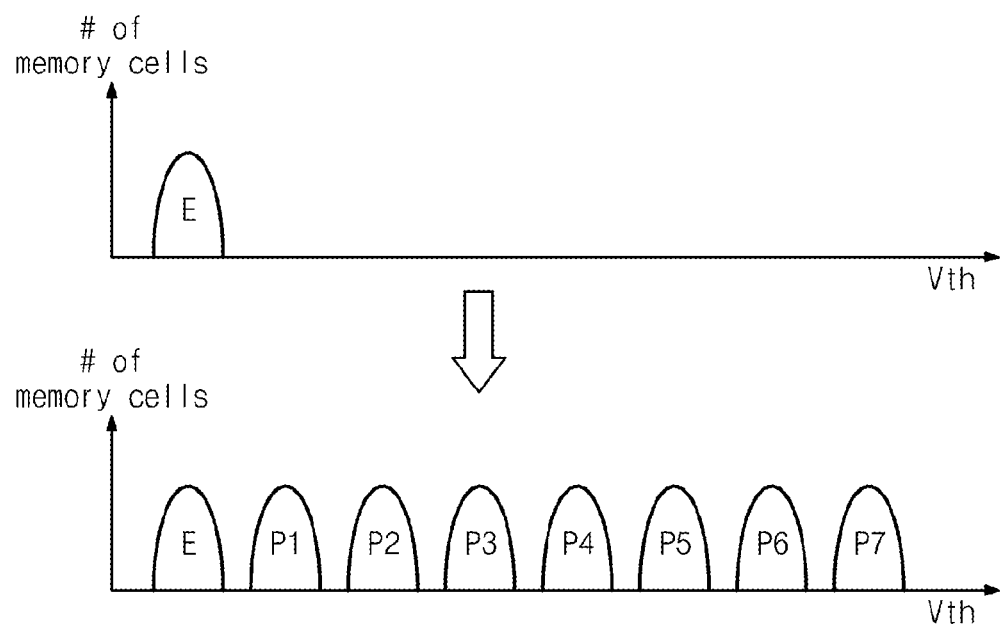
FIG. 9 illustrates an example in which memory cells are programmed.

FIG. 9 illustrates an example in which memory cells are programmed. In FIG. 9, a horizontal axis represents a threshold voltage of memory cells and a vertical axis represents the number of the memory cells MC. That is, variation of the threshold voltage distribution range of the memory cells MC is shown in FIG. 9.

Referring to FIGS. 4 and 9, when the memory block BLKa is erased, memory cells MC1 to MC6 of the memory block BLKa have an erase state E. When the memory cells MC1 to MC6 of the memory block BLKa are programmed according to write requests of the external host device or background program requests, the memory cells MC1 to MC6 may have the erase state E and first to seventh program states P1 to P7.

In example embodiments, the number of the program states P1 to P7 of the memory cells MC1 to MC6 is not limited. The number of program states P1 to P7 of memory cells MC1 to MC7 is decided depending on the number of bits programmed into a single memory cell MC and is not limited.

Figure 10:
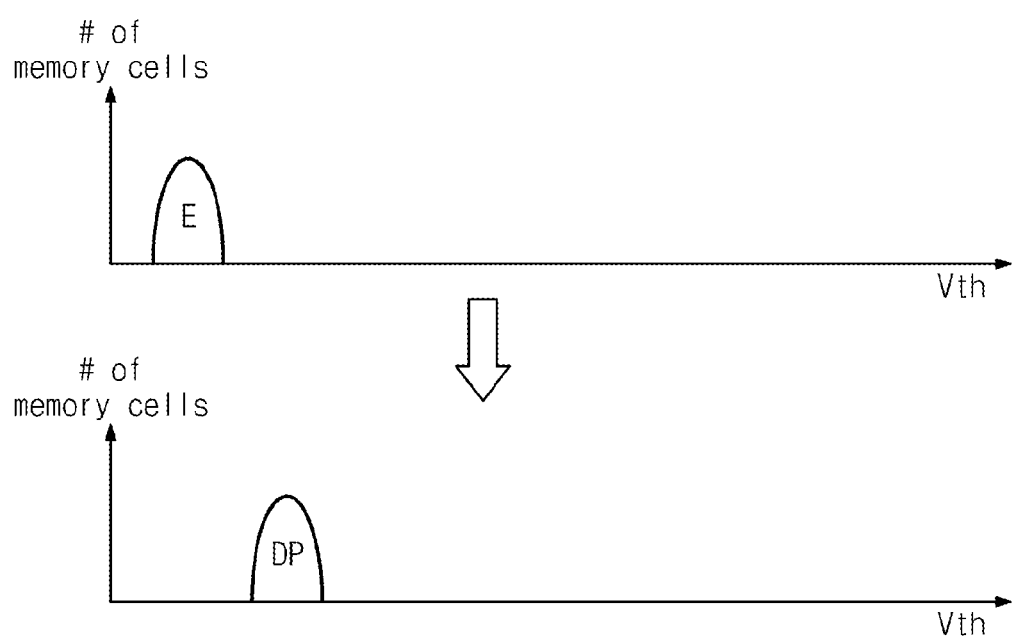
FIG. 10 illustrates another example in which memory cells are programmed.

FIG. 10 illustrates another example in which memory cells are programmed. In FIG. 10, a horizontal axis represents a threshold voltage of memory cells and a vertical axis represents the number of the memory cells MC. That is, variation of the threshold voltage distribution range of the memory cells MC is shown in FIG. 10.

Referring to FIGS. 4 and 10, when the memory block BLKa is erased, memory cells MC1 to MC6 of the memory block BLKa have an erase state E. When the memory cells MC1 to MC6 of the memory block BLKa are programmed according to dummy program requests, the memory cells MC1 to MC6 may have a dummy program state DP.

As compared to FIG. 9, dummy-programmed memory cells MC do not have the erase state E and are programmed to have the dummy program state DP with a higher threshold voltage distribution range than the erase state E. For example, a lower limit of a threshold voltage distribution range of the dummy program state DP may be equal to or higher than zero potential. In example embodiments, dummy data for performing a dummy program operation may be set to indicate that all memory cells MC of a program unit are a program target.

For example, during a dummy program operation, a ground voltage or a positive voltage higher than the ground voltage may be used as a verify voltage. During the dummy program voltage, memory cells MC may be programmed to have threshold voltages higher than the verify voltage.

For example, during a dummy program operation, memory cells MC may be programmed without verification. In example embodiments, a dummy program operation of the memory cells MC may be completed by applying one or more positive voltages (e.g., program voltages) to a wordline connected to control gates of the memory cells MC.

In another embodiment, during the program operation, memory cells MC may be programmed at least one of the program states P1 to P7 shown in FIG. 9. For example, memory cells may be programmed to have the first program state P1 having lowest range of threshold voltages. For example, memory cells may be programmed to have a pattern of the program states P1 to P7.

Figure 11:
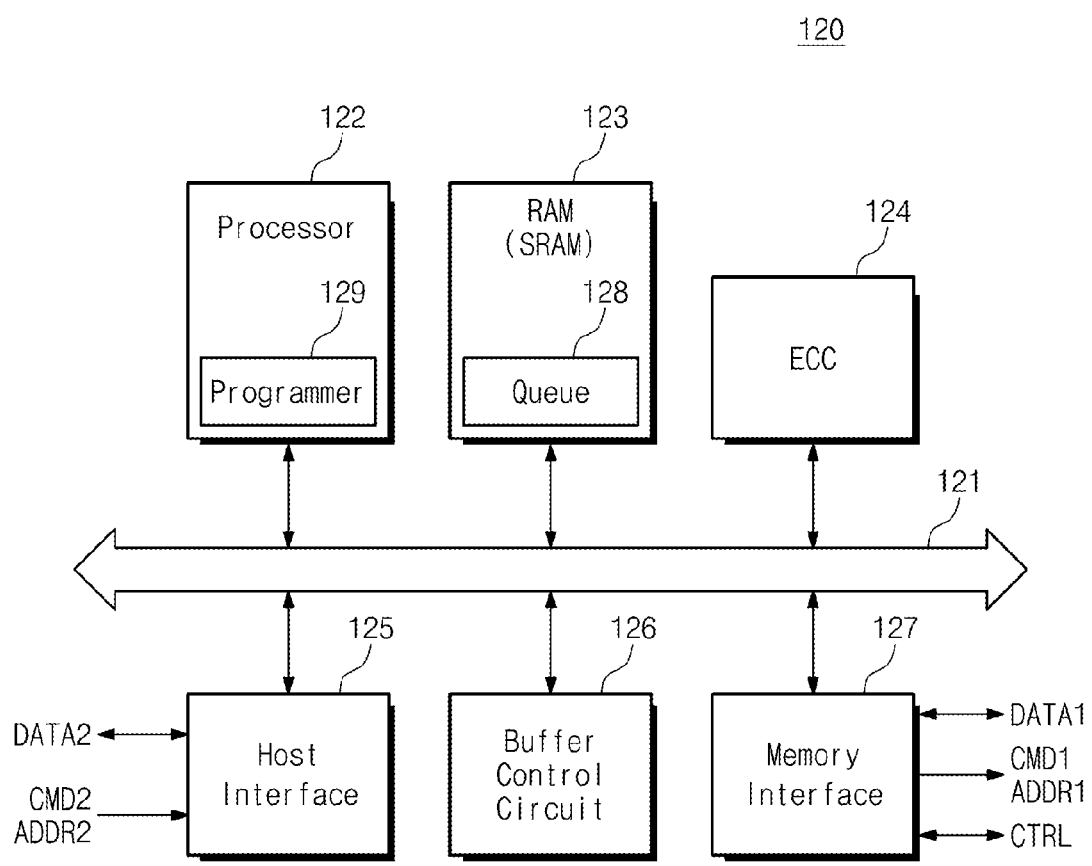
FIG. 11 is a block diagram of a memory controller according to example embodiments of inventive concepts.

FIG. 11 is a block diagram of a memory controller 120 according to example embodiments of inventive concepts. As illustrated, the memory controller 120 includes a bus 121, a processor 122, a RAM 123, an error correction block (ECC) 124, a host interface 125, a buffer control circuit 126, and a memory interface 127.

The bus 121 is configured to provide a channel between components.

The processor 122 may control the overall operation of the memory controller 120 and perform a logical operation. The processor 122 may communicate with an external host (see FIG. 1) through the host interface 125. The processor 122 may store a second command CMD2 or a second address ADDR2 received through the host interface 125 in the RAM 123. The processor 122 may generate a first command CMD1 or a first address ADDR1 according to the second command CMD2 or the second address ADDR2 stored in the RAM 123 and output the first command CMD1 and the first address ADDR1 through the memory interface 127.

The processor 122 may output second data DATA2 received through the host interface 125 through the buffer control circuit 126 or store the second data DATA2 in the RAM 123. The processor 122 may output data stored in the RAM 123 or data received through the buffer control circuit 126 as first data DATA1 through the memory interface 127. The processor 122 may store the first data DATA1 received through the memory interface 127 or output the first data DATA1 through the buffer control circuit 126. The processor 122 may output data stored in the RAM 123 or data received through the buffer control circuit 126 as the second data DATA2 through the host interface 125 or as the first data DATA1 through the memory interface 127.

The processor 122 includes a care programmer 129 according to example embodiments of inventive concepts. For example, the care programmer 129 may be provided in the form of software driven by the processor 122, hardware provided as a part of the processor 122 or a combination of software and hardware.

The RAM 123 may be used as a working memory, a cache memory or a buffer memory of the processor 122. The RAM 123 may store codes and commands executed by the processor 122. The RAM 123 may store data processed by the processor 122. The RAM 123 may include a static RAM (SRAM). The RAM 123 may include a background program queue 128 according to example embodiments of inventive concepts. For example, a portion of a storage space of the RAM 123 may be allocated to be used as the background program queue 128.

The ECC 124 may perform error correction. The ECC 124 may generate an error correction code (e.g., parity) for performing error correction based on the first data DATA1 to be output to the memory interface 127 or the second data DATA2 received from the host interface 125. The first data and the parity may be output through the memory interface 127. The ECC 124 may perform error correction of the received first data DATA1 using the first data DATA1 and the parity received through the memory interface 127. In example embodiments, the ECC 124 may be included in the memory interface as a component of the memory interface 127.

The host interface 125 is configured to communicate with an external host device according to the control of the processor 122. The host interface 125 may receive a second command CMD2 and a second address ADDR2 from the external host device 100 and exchange the second data DATA2 with the external host device.

The host interface 125 may be configured to perform communication based on at least one of various communication protocols such as USB (Universal Serial Bus), SATA (Serial AT Attachment), SAS (Serial Attached SCSI), HSIC (High Speed Interchip), SCSI (Small Computer System Interface), Firewire, PCI (Peripheral Component Interconnection), PCIe (PCI express), NVMe (NonVolatile Memory express), UFS (Universal Flash Storage), SD (Secure Digital), MMC (MultiMedia Card), and eMMC (embedded MMC).

The buffer control circuit 126 is configured to control the RAM 130 (see FIG. 1) according to the control of the processor 122. The buffer control circuit 126 may write data into the RAM 130 and read data from the RAM 130.

The memory interface 127 is configured to communicate with the nonvolatile memory 110 (see FIG. 1) according to the control of the processor 122. The memory interface 127 may transmit the first command CMD1 and the first address ADDR1 to the nonvolatile memory 110 and exchange the first data DATA1 and a control signal CTRL with the nonvolatile memory 110.

In example embodiments, the storage device 110 may not be provided with the RAM 130. That is, the storage device 110 may not include a separate memory outside the memory controller 120 and the nonvolatile memory 110. In this case, the memory controller 120 may not be provided with the buffer control circuit 126 and the function of the RAM 130 may be performed by the RAM 123 in the memory controller 120.

In example embodiments, the processor 122 may control the memory controller 120 using codes. The processor 122 may load codes from the nonvolatile memory (e.g., ROM) provided in the memory controller 120. In example embodiments, the processor 122 may load codes received from the memory interface 127.

In example embodiments, the bus 121 of the memory controller 120 may be classified into a control bus and a data bus. The data bus may be configured to transmit data in the memory controller 120, and the control bus may be configured to transmit control information such as a command and an address in the memory controller 120. The data bus and the control bus may be separated from each other and may not interfere with each other or may not have an influence on each other. The data bus may be connected to the host interface 125, the buffer control circuit 126, the ECC 124, and the memory interface 127. The control bus may be connected to the host interface 125, the processor 122, the buffer control circuit 126, the RAM 123, and the memory interface 127.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A storage device comprising:
   a nonvolatile memory including a plurality of memory blocks, each memory block including a plurality of cell strings on a substrate, each cell string including at least one ground selection transistor, a plurality of memory cells and at least one string selection transistor stacked on the substrate in a direction perpendicular to the substrate, each of the at least one ground selection transistor, a plurality of memory cells and at least one string selection transistor including a charge trap layer; and
   a memory controller configured to receive a first program request from an external host device and program first memory cells of a memory block according to the first program request,
   wherein the memory controller is further configured to program second memory cells of the memory block without a request of the external host device if a second program request is not received from the external host device for a critical time.

2. The storage device as set forth in claim 1, wherein the memory controller is configured to program the second memory cells in response to the second program request if the second program request is received from the external host device within the critical time.

3. The storage device as set forth in claim 1, wherein the critical time is set such that degradation of memory cells of the memory block is below a critical level, the degradation being caused by leaving the memory cells unprogrammed after erasing.

4. The storage device as set forth in claim 1, wherein after the memory block is erased and the first memory cells are programmed, remaining memory cells of the memory block are programmed within second critical time regardless whether program request for the remaining memory cells are received.

5. The storage device as set forth in claim 1, wherein the memory controller is configured to program the second memory cells without the request using an internal copy operation which read data from the nonvolatile memory and program the read data into the nonvolatile memory if the second program request has not received within the critical time.

6. The storage device as set forth in claim 5, wherein the internal copy operation includes at least one of garbage collection copying valid data to another memory block from a memory block in which the valid data and invalid data are stored, wear-leveling copying data stored in a memory block having a first erase count to another memory block having a second erase count, the second erase count being lower than the first erase count, bad block management copying data stored in a memory block determined as a bad block to another memory block, and read reclaim copying data stored in a memory block in which read errors occur to another memory block.

7. The storage device as set forth in claim 1, wherein the memory controller is configured to program the second memory cells using dummy data.

8. The storage device as set forth in claim 7, wherein the memory controller is configured to program the first memory cells to have two or more program states according to the first program request and the second memory cells to have at least one of the two or more program states using the dummy data.

9. The storage device as set forth in claim 7, wherein the memory controller is configured to program the first memory cells to have two or more program states according to the first program request and the second memory cells a pattern of the two or more program states using the dummy data.

10. The storage device as set forth in claim 7, wherein the memory controller is configured to program the second memory cells such not to have an erase state using the dummy data.

11. The storage device as set forth in claim 7, wherein the memory controller is configured to program the second memory cells using the dummy data by applying a program voltage without verification to the second memory cells.

12. The storage device as set forth in claim 7, wherein the memory controller is configured to program the second memory cells to have positive threshold voltages.

13. The storage device as set forth in claim 1, wherein the memory controller is configured to erase the memory block in the nonvolatile memory and program the first memory cells immediately after the erasing the memory block.

14. The storage device as set forth in claim 1, wherein the memory controller is configured to program the second memory cells if the second write request is not received from the external host device for the critical time after the first program request is received.

15. The storage device as set forth in claim 1, the memory controller is configured to program the second memory cells if the second write request is not received from the external host device for the critical time after the first memory cells are programmed.

16. The storage device as set forth in claim 1, wherein
cell strings of which string selection transistors are connected to a common string selection line in a memory block forms a plane, and
the first memory cells and the second memory cells belong to a same plane of the memory block.

17. A storage device comprising:
a nonvolatile memory; and
a memory controller configured to control the nonvolatile memory,
the memory controller being configured to receive a first program request, program first memory cells of the nonvolatile memory device in response to the first program request, and program second memory cells of the nonvolatile memory without a request of an external host device if a second program request has not received from the external host device within a critical time after programming the first memory cells or receiving the first program request.

18. The storage device as set forth in claim 17, wherein the nonvolatile memory includes a plurality of cell strings arranged on a substrate, and
each of the cell strings includes at least one selection transistor and a plurality of memory cells stacked on the substrate in a direction perpendicular to the substrate, the at least one selection transistor and the plurality of memory cells having a charge trap layer.

19. The storage device as set forth in claim 17, wherein the first memory cells and the second memory cells belong to a same memory block.

20. The storage device as set forth in claim 17, wherein the memory controller is configured to program the second memory cells in response to the second program request if the second program request is received within the critical time.

21. The storage device as set forth in claim 20, wherein the memory controller is configured to program third memory cells of the nonvolatile memory without a request of the external host device if a third program request has not been received from the external host device within a second critical time after programming the second memory cells or receiving the second program request.

22. The storage device as set forth in claim 17, wherein the memory controller is configured to program the second memory cells without the request using an internal copy operation which read data from the nonvolatile memory and program the read data into the nonvolatile memory.

23. The storage device as set forth in claim 17, wherein the memory controller is configured to program the second memory cells without the request using a dummy program operation.

24. An operating method of a storage device including a nonvolatile memory and a memory controller configured to control the nonvolatile memory, the operating method comprising:
receiving a first program request using the memory controller from an external host device;
programming first memory cells of the nonvolatile memory using the memory controller in response to the first program request; and
programming second memory cells of the nonvolatile memory using the memory controller without a request of the external host device if a second program request is not received from the external host device for a critical time.

25. The operating method as set forth in claim 24, wherein the second memory cells are programmed without the request if the second program request is not received from the external host device for the critical time after the receiving the first program request or the programming the first memory cells.

26. The operating method as set forth in claim 24, wherein the second memory cells are programmed without the request using an internal copy operation which read data from the nonvolatile memory and program the read data into the nonvolatile memory.

27. The operating method as set forth in claim 25, wherein the second memory cells are programmed without the request using a dummy program operation.

28. A solid state drive comprising:
a nonvolatile memory including a plurality of memory blocks;
a random access memory; and
a memory controller configured to receive a first program request from an external device, store first data received from the external device in association with the first program request into the random access memory, and program first memory cells of a memory block with the first data stored in the random access memory according to the first program request,
wherein the memory controller is further configured to program second memory cells of the memory block without a request and data from the external host device if a second program request has not received from the external host device for critical time.

29. The solid state drive of claim 28, wherein the memory controller is configured to read second data from the nonvolatile memory to store the second data into the random access memory and program the second memory cells with the second data stored in the random access memory.

30. The solid state drive of claim 28, wherein each memory block includes a plurality of cell strings on a substrate, each cell string including a plurality of cell strings on a substrate, each cell string including at least one ground selection transistor, a plurality of memory cells and at least one string selection transistor stacked on the substrate in a direction perpendicular to the substrate, each of the at least one ground selection transistor, a plurality of memory cells and at least one string selection transistor including a charge trap layer.

* * * * *